United States Patent [19]
Maffett

[11] 3,780,468
[45] Dec. 25, 1973

[54] FISHING TACKLE BOX

[76] Inventor: William C. Maffett, c/o William C. Maffett and Associates, Smithville, Tenn. 37166

[22] Filed: Oct. 20, 1972

[21] Appl. No.: 299,314

[52] U.S. Cl. .............................. 43/54.5 R, 220/43
[51] Int. Cl. ........................................... A01k 97/00
[58] Field of Search ............. 43/54.5 R, 55, 57.5 R, 43/57.5 A; 220/43

[56] References Cited
UNITED STATES PATENTS

| | | |
|---|---|---|
| 3,047,349 | 7/1962 | Powell .............................. 43/54.5 R |
| 424,603 | 4/1890 | Favor ................................ 43/54.5 R |
| 1,926,162 | 9/1933 | Moberly ........................... 43/54.5 R |
| 3,348,329 | 10/1967 | Seemann ......................... 43/54.5 R |
| 3,156,063 | 11/1964 | Mace ................................ 43/54.5 R |
| 3,410,018 | 11/1968 | Woolworth ...................... 43/54.5 R |

Primary Examiner—Louis G. Mancene
Assistant Examiner—Gregory E. McNeill
Attorney—Harrington A. Lackey

[57] ABSTRACT

A fishing tackle box including a compartment having a wall structure in which top ledges are formed to receive the inverted ends of the fish hooks of freely suspended fishing lures. The top ledges may be formed of a soft material penetrable by the sharp ends of the fish hooks, such as a foamed plastic material; or an opening may be pre-formed in the ledge for receiving the end of each hook; or the wall structure may be thin enough for each hook to hang over the top edge of a wall.

In the preferred form of the invention, the wall structure includes a plurality of spaced partition walls to form separate compartments for receiving the lures, and one form of the invention includes such wall structure in a cascade arrangement.

3 Claims, 7 Drawing Figures

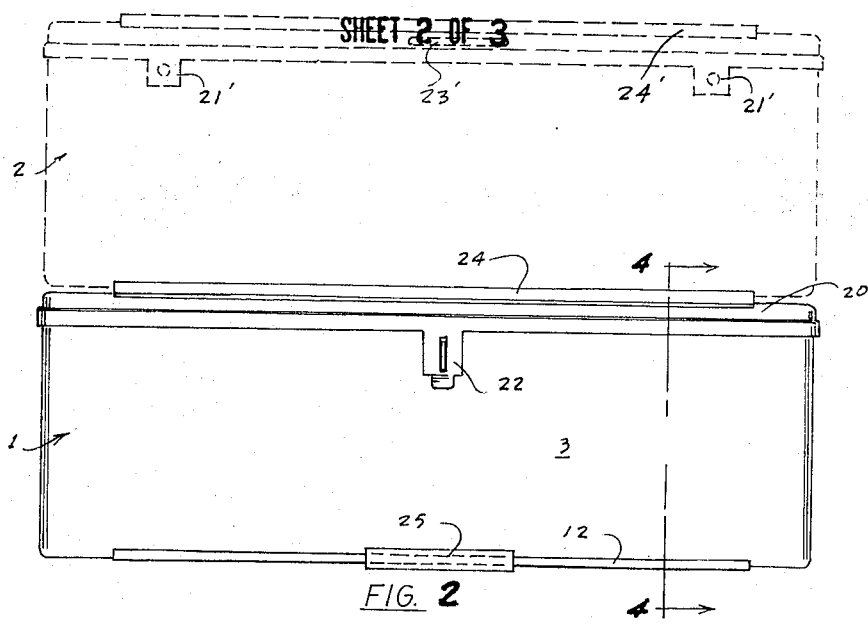
FIG. 2
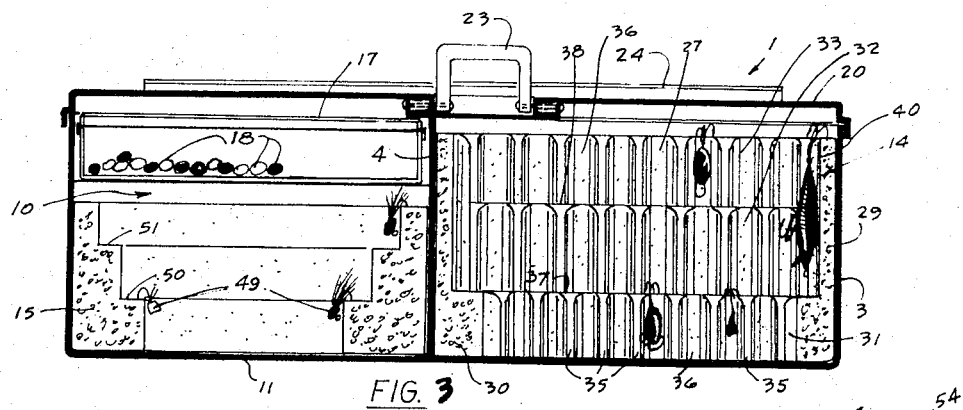
FIG. 3
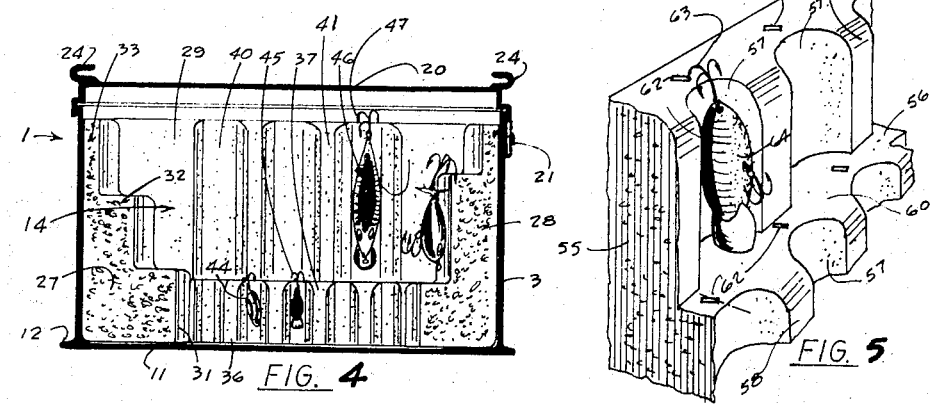
FIG. 4
FIG. 5

FISHING TACKLE BOX

BACKGROUND OF THE INVENTION

This invention relates to a fishing tackle box, and more particularly to a fishing tackle box having a compartment especially adapted for hanging fishing lures.

In conventional tackle boxes, either no accommodation has been made for the reception of artificial fishing lures, or trays are provided for receiving the lures extended horizontally.

Accordingly, in conventional fishing tackle boxes, the lures are not easily found, are inaccessible, or become tangled with each other or other items in the tackle box.

SUMMARY OF THE INVENTION

It is therefore an object of this invention to provide a fishing tackle box having a compartment with unique wall structure to provide an orderly arrangement of the artificial fishing lures.

More specifically, the fishing tackle box made in accordance with this invention includes one or more compartments or enclosures having wall structure for supporting the lures by the connecting fish hooks in inverted positions. The wall structure is generally vertical having an interior surface of greater height than the overall length of the lure and having a top ledge portion for receiving the barbed end of the inverted hook to suspend the lure against the interior surface of the wall structure. The wall structure is preferably partitioned to provide an individual compartment for each lure.

In one form of the wall structure, at least the top ledge portion is made of a soft mateial penetrable by the barbed end of the hook, such as a foamed plastic material, or cork.

In another form of the wall structure, the material may be foamed plastic, cork or even other types of materials which are not penetrable by the end of the hook, but in which an opening has been pre-formed for receiving the hook in inverted position.

In another form of the invention, the partition walls project from the inner surface of the main wall and terminate in top edges over which the inverted hook is hung. The top edges of these partition walls are preferably notched or depressed so that the bight portion of the hook will gravitate toward the lowest portion of the top edge to better maintain the lure in its hanging position.

In another form of wall structure, tiers of partitioned enclosure walls are formed in a cascade arrangement to hold a greater number of lures within the same lateral dimensions of the compartment of a fishing tackle box.

BRIEF DESCRIPTION OF THE DRAWINGS

FIG. 2 is a front elevation of the tackle boxes disclosed in FIG. 1, with the upper box disclosed in phantom in assembled position;

FIG. 3 is an enlarged section taken along the line 3—3 of FIG. 1; of the assembled lower box;

FIG. 4 is an enlarged section taken along line 4—4 of FIG. 2;

FIG. 5 is an enlarged fragmentary perspective view of a modified form of wall structure for supporting artifical lures;

DESCRIPTION OF THE PREFERRED EMBODIMENTS

Figure 1:
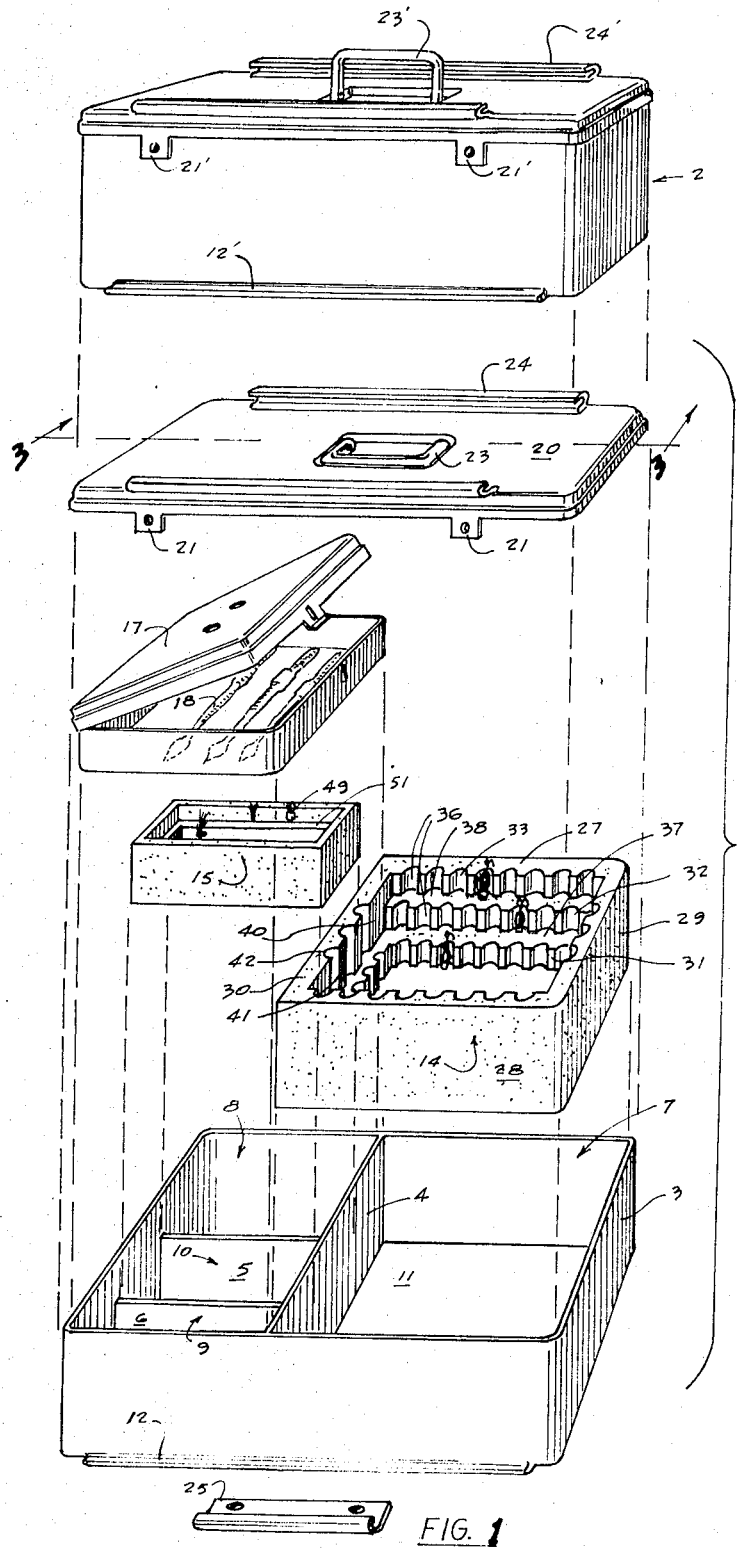
FIG. 1 is an exploded front perspective view of a pair of stacked fishing tackle boxes made in accordance with this invention.

Referring now to the drawings in more detail, FIGS. 1 and 2 disclose a pair of identical tackle boxes 1 and 2, the upper tackle box 2 being adapted to be mounted upon the lower tackle box 1. The lower tackle box 1 includes a rectangular shaped outer wall 3 separated by partition walls 4, 5 and 6 into a large compartment 7 and three smaller compartments 8, 9 and 10. All of the compartments have a common bottom wall 11.

Projecting outwardly from the bottoms of both sides of the wall 3 are a pair of tongues or flanges 12.

Adapted to be inserted within the compartment 7 is a rectangular modular wall structure 14, preferably of polystyrene foam material, adapted to receive artificial fishing lures.

Adapted to be received in the compartment 10 is a small rectangular modular insert 15, also preferably made of polystyrene foam material.

Since the height of the partition walls 5 and 6 are less than the height of the partition wall 4, an elongated space is provided spanning the entire width of the box 3 above the partition walls 5 and 6 for receiving a plastic box 17 on the top edges of the partition walls 5 and 6. The box 17 is adapted to hold any desired articles, such as the artificial worm lures 18.

A rectangular cover or lid 20 is mounted upon the outer wall 3 of box 1 by means of flexible hinges 21. The opposite side of the lid may be latched by means of a hasp 22. (FIG. 2).

A recessed handle 23 may also be provided on top of the lid 20, adapted to be pivoted upright to an operative position, when desired.

A pair of elongated inwardly facing grooved tracks 24 may be formed along opposite sides of the cover 20 for slidably receiving the bottom flanges 12 of the upper box 2, when it is desired to stack the boxes 1 and 2. Box 2 is also provided with hinges 21', handle 23' and grooved tracks 24' with identical construction to their counter-parts in box 1.

The flanges 12 on the bottom box 1 may be slidably received in opposed channel tracks 25, which may be fixed to the boat seat or some other portion of the boat by means, not shown.

Referring now more particularly to the modular wall structure 14 of FIGS. 1, 3 and 4, the entire structure 14 is preferably molded from polystyrene foam into the disclosed shape, and includes two side walls 27 and 28, and two end walls 29 and 30. As best disclosed in FIGS. 1 and 4, the side wall 27 is formed in three cascading vertical sections, including a lower wall section 31, an intermediate wall section 32 and an upper wall section 33.

Formed along the interior face of the lower wall section 31 are a plurality of longitudinally spaced vertical partition walls 35 forming between them the lure channels or grooves 36. The upper portion of the lower wall section 31 terminates in a flat horizontal ledge 37.

Spaced laterally outwardly from and above the lower wall section 31 is the intermediate wall section 32. The bottom of the intermediate wall section 32 also terminates in the ledge 37, The inner facial surface of the intermediate wall section 32 is likewise provided with spaced partitions 35 and lure chambers 36, constructed in the same manner as those in the lower wall section 31. The upper end of the intermediate wall section 32 terminates in another upper ledge 38, which forms the floor or bottom of the upper wall section 33. In the same manner, the upper section 33 is spaced outwardly from and above the intermediate section 32, and the inner face of the upper section 33 is also provided with the similarly constructed partitions 35 and lure channels 36.

The side wall 28 has substantially the same three-tier cascading structure as the wall 27.

Each end wall 29 and 30 has the same lower wall section construction 31 as the side wall 27, which actually forms a continuation thereof around the periphery of the modular insert 14. However, the walls 29 and 30 have no intermediate sections corresponding to the intermediate section 32, and therefore no ledge 38, although the ledge 37 continues around all four of the inner faces of the walls 27, 28, 29 and 30.

The upper wall sections 40 of the end walls 29 and 30 extend from the ledge 37 upward to the top of the modular insert 14, or, in other words, they extend the combined height of the intermediate and upper wall sections 32 and 33. The wall sections 40 also include partitions 41 and extra long lure channels 42.

As illustrated in FIGS. 1, 3 and 4, lures such as 44 (FIG. 4) have their fish hooks 45 inverted with a barbed end inserted into the lower ledge 37, by virtue of the hook point penetrating the soft foam material. The hook 45 penetrates the ledge 37 in such a position that the body of lure 44 hanges freely within the corresponding lure channel 36, where it is easily retained within the compartment 7 of the box 1, regardless of the movement or jostling of the box 1, until the hook 45 is positively removed from the ledge 37.

In a similar manner, the long lure 46 is held in an elongated lure channel 42, by appropriately inserting the fish hook 47 within the top surface of the wall 29.

Also as best disclosed in FIG. 4, the height of the respective sections 31, 32 and 33 may be different from the opposed sections in the opposite wall 28, to accommodate lures of different lengths.

The insert 14 is readily removed from the compartment 7 to facilitate replacement or substitution of lures in the various compartments of the various lure channels 36 and 42, or for complete replacement by another modular insert 14. As a matter of fact, several modular inserts 14 may be provided to support different groups of lures, so that the entire modular insert with its group of lures may be substituted for any other modular insert with its group of lures in the compartment 7.

Insert 15 is similar to insert 14, with the exception that it is smaller and is not provided with any partition wall such as 35 or 41. As illustrated in FIG. 3, the lures 49 are small flies having hooks for insertions in the corresponding cascading ledges 50, 51 and the top flat edge of the module 15. Because of the lightness of the flies 49 partitions are not as necessary as they are for the longer and heavier lure bodies 44 and 46.

FIG. 5 discloses a fragment of a modified modular insert 54, also made from a plastic foam, such as polystyrene foam. The modular insert 54 is provided with an upper wall section 55 and a next lower wall section 56 having lure channels 57 formed by partitions 58. The wall sections 55 and 56 are cascaded to form the intermediate ledge 60. Both the ledge 60 and the top edge of the wall section 55 are provided with pre-formed slots or grooves 62 for receiving the end of the hook 63 of a lure body 64. The slots 62 are preferably inclined to the plane of the wall sections 55 and 56 to provide a binding action between the hook 63 and the inner surfaces of the corresponding slot 62.

Figure 6:
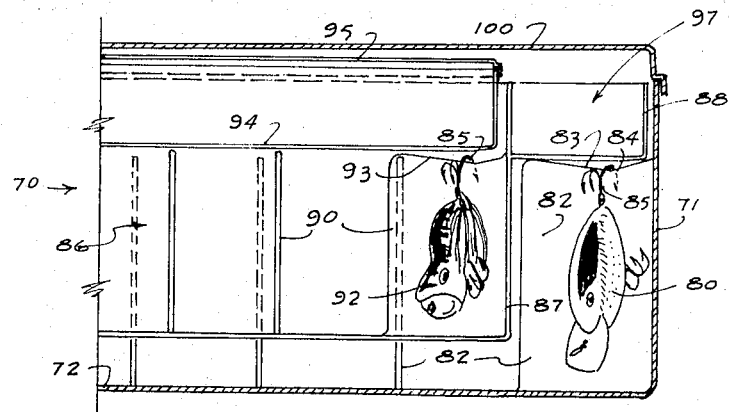
FIG. 6 is a fragmentary sectional elevation of an assembled tackle box made in accordance with another modification of this invention.
Figure 7:
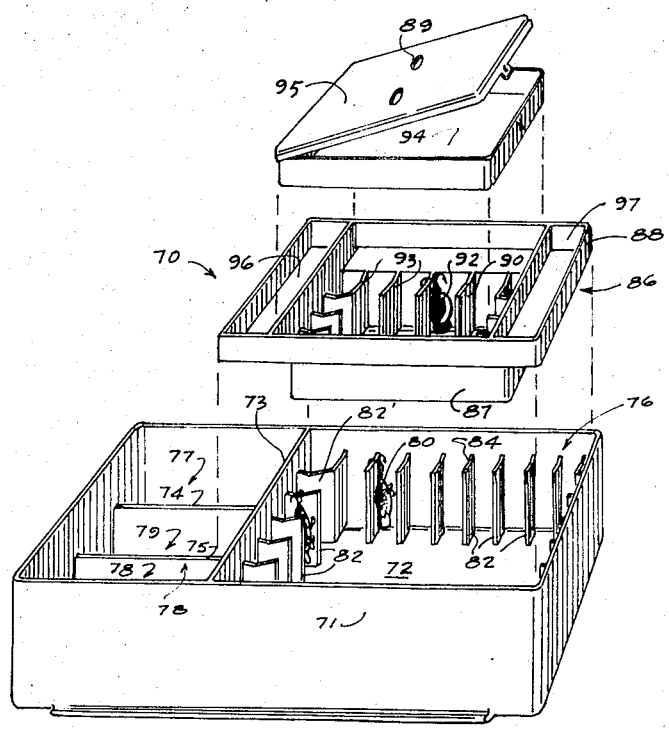
FIG. 7 is an exploded perspective view of the tackle box illustrated in FIG. 6, with the cover removed.

In the modification disclosed in FIGS. 6 and 7, the tackle box 70 also includes a rectangular outer wall enclosure 71 having a bottom wall 72, median partition wall 73 and shorter partition walls 74 and 75 to form compartments 76, 77, 78 and 79.

In order to support lure bodies 80 in compartment 76, the plurality of vertical, relatively thin, partition walls 82 are fixed to, and project inward at substantially right angles to, the respective portions of the outer walls 71. As best illustrated in FIG. 6, the top edge 83 of each partition wall 84 converges downward toward the middle from its end edges to form the depressed valley or notch 84. Thus when the hook 85 of the lure body 80 is hung over the top edge 83 it gravitates toward the lowest portion of the valley 84 for stability in hanging from a predetermined position. As illustrated in FIG. 7, corner separator walls 82' may merge.

Also adapted to fit within the compartment 76 is a modular receptacle 86 having a lower rectangular body 87 and an outwardly projecting upper body 88. The lower body 87 is adapted to fit within the space between the inner edges of the separator walls 82, while the projecting horizontal bottom surface of the upper body 88 is adapted to seat upon the top edges 83 of the separator walls 82, thereby holding the fish hooks 85 in place in their respective valleys 84.

The lower body 87 may be hollow, and may also be provided with separator panels 90 identical in construction to the separator panels 82 for the support of additional lures, such as 92. The upper edges 93 of partitions 90 may terminate at the upper plane of the lower body 87 to provide a space for receiving a plastic box 94, having a lid 95. The upper body 88 may also be provided with elongated compartments or troughs 96 and 97 for receiving other articles of fishing tackle.

The height of the partition walls 74 and 75 are shorter than the height of the partition wall 73 so that a box, such as plastic box 17, can be received on top of the walls 74 and 75, in the same manner as illustrated in FIG. 1. With the modular receptacle 86 and plastic box 94 seated in their above described positions, the entire box 71 may be closed by the lid or cover 100.

What is claimed is:

1. A fishing tackle box comprising:
   a. an elongated, vertical wall having an inner surface,
   b. a plurality of upright partition walls projecting inward from said inner surface, said partition walls having top edges,
   c. said partition walls being longitudinally spaced apart sufficiently to receive between adjacent partition walls an artificial fishing lure having an inverted hook hanging over a top edge of one of said partition walls, to suspend said lure in a hanging position,
   d. each of said top edges having a middle portion and end portions, and at least the end portions of said top edges lying in a horizontal seating plane, but none of said portions projecting above said horizontal seating plane, e. an elongated body having a horizontal exterior bottom seating surface adapted to engage said top edges in said seating plane to hold the inverted hooks of lures in place between said bottom seating surface and said top edges.

2. The invention according to claim 1 in which said middle portion of at least one of said top edges is below said seating plane to form a valley for receiving the inverted hook of a lure.

3. The invention according to claim 1 in which said elongated body comprises a bottom wall portion of a receptacle within said box.

* * * * *